(12) United States Patent
Williams-Koroma

(10) Patent No.: US 12,363,140 B2
(45) Date of Patent: Jul. 15, 2025

(54) SECURITY COMPATIBILITY TESTING AND CONFIGURATION PLATFORM

(71) Applicant: CyDeploy, Inc., Baltimore, MD (US)

(72) Inventor: Tina Williams-Koroma, Gambrills, MD (US)

(73) Assignee: CyDeploy, Inc., Baltimore, MD (US)

( * ) Notice: Subject to any disclaimer, the term of this patent is extended or adjusted under 35 U.S.C. 154(b) by 358 days.

(21) Appl. No.: 17/704,068

(22) Filed: Mar. 25, 2022

(65) Prior Publication Data
US 2022/0311787 A1    Sep. 29, 2022

Related U.S. Application Data

(60) Provisional application No. 63/166,472, filed on Mar. 26, 2021.

(51) Int. Cl.
*H04L 9/40* (2022.01)
*G06F 9/455* (2018.01)

(52) U.S. Cl.
CPC ...... *H04L 63/1416* (2013.01); *G06F 9/45558* (2013.01); *H04L 63/145* (2013.01); *H04L 63/20* (2013.01); *G06F 2009/45587* (2013.01); *G06F 2009/45595* (2013.01)

(58) Field of Classification Search
CPC ... H04L 63/1416; H04L 63/145; H04L 63/20; H04L 63/1433; G06F 9/45558; G06F 2009/45587; G06F 2009/45595; G06F 2009/45562; G06F 21/53
See application file for complete search history.

(56) References Cited

U.S. PATENT DOCUMENTS

| | | | | |
|---|---|---|---|---|
| 8,650,397 | B2 * | 2/2014 | Haddad | H04L 9/0827 |
| | | | | 713/168 |
| 8,839,222 | B1 * | 9/2014 | Brandwine | G06F 8/65 |
| | | | | 717/168 |
| 9,819,661 | B2 * | 11/2017 | Stern | H04L 9/088 |
| 10,249,014 | B2 * | 4/2019 | Bala | G06F 9/45558 |
| 10,430,204 | B2 * | 10/2019 | Reeves | G06F 9/445 |
| 10,735,468 | B1 * | 8/2020 | Viljoen | H04L 63/145 |
| 10,817,319 | B1 * | 10/2020 | Thomas | G06F 9/45558 |
| 10,915,314 | B2 * | 2/2021 | Mohammed | H04L 67/61 |
| 11,216,265 | B1 * | 1/2022 | Hornbeck | G06F 9/5072 |

(Continued)

OTHER PUBLICATIONS

Streamlining Patch Testing and Deployment, 2004 https://www.vmware.com/content/dam/digitalmarketing/vmware/en/pdf/techpaper/gsx-landesk-white-paper.pdf.

*Primary Examiner* — Badri Narayanan Chempakesan
(74) *Attorney, Agent, or Firm* — University of Maryland Carey School of Law

(57) ABSTRACT

A novel security testing compatibility and configuration platform that utilizes a virtual emulation on a cloud-based service to assess the functionality of a device after implementing secure configurations. The disclosed platform provides a computer-implemented method for security testing compatibility and configuration comprising (1) using a virtual emulation to capture images of a connected device; (2) building a virtual machine based on the images; (3) applying secure configurations to the virtual machine; (4) executing functions and commands on the virtual machine using AI; (5) creating a report of the results; and (6) applying secure configurations to the connected device.

16 Claims, 3 Drawing Sheets

(56) References Cited

U.S. PATENT DOCUMENTS

| | | | |
|---|---|---|---|
| 2003/0131229 A1* | 7/2003 | Gladney | H04L 63/12 |
| | | | 713/155 |
| 2005/0120199 A1* | 6/2005 | Carter | G06F 21/64 |
| | | | 713/150 |
| 2014/0157260 A1* | 6/2014 | Balani | G06F 8/61 |
| | | | 718/1 |
| 2014/0181504 A1* | 6/2014 | Almahallawy | H04L 63/0823 |
| | | | 713/156 |
| 2014/0313278 A1* | 10/2014 | Periyannan | H04N 7/152 |
| | | | 348/14.08 |
| 2016/0127333 A1* | 5/2016 | Sood | H04L 63/06 |
| | | | 380/44 |
| 2016/0373474 A1* | 12/2016 | Sood | G06F 21/53 |
| 2019/0342162 A1* | 11/2019 | Bendre | H04L 41/12 |

* cited by examiner

SECURITY COMPATIBILITY TESTING AND CONFIGURATION PLATFORM

TECHNICAL FIELD OF THE INVENTION

Embodiments of the disclosed invention relate to security configurations and patches and compatibility on information technology and Internet of Things (IoT) devices.

BACKGROUND

As innovation continues to occur at high speed, small and medium sized businesses (SMBs) and enterprises continue to face issues with secure compatibility and configuration of connected devices and software. SMBs and enterprises often neglect to implement secure configurations and patches on information technology devices, including Internet of Things (IoT) devices due to a lack of awareness, skill, or time and because of concerns about how these configurations or patches would impact their business environment or technologies. SMBs and enterprises may not have access to test environments that enable them to test and understand the impact of security configurations and patches before they are rolled out into the production environment. As a result, many SMBs and enterprises either fail to incorporate or delay incorporation of vital security configurations and patches. To compound the problem, many makers of IoT devices prioritize consumer convenience over security and so devices available on the market may not have secure configurations by default.

Given the proliferation and ease with which IoT devices are deployed, there is currently a need to ensure that these devices, in addition to regular information technology devices, remain secure. There is proposed legislation requiring IoT devices used in United States government facilities to meet certain security and configuration requirements. Although these devices are numerous, they often share common characteristics that can improve deployment and maintenance of secure configurations. However, the difficulty of working with IoT devices as opposed to conventional information technology devices is that they are frequently resource constrained.

Change management related to devices, for internal use and for external sales to customers, presents a major challenge for SMBs and enterprises. The challenge is associated with software upgrades (such as patches) and configuration changes. Current market solutions consist of software tools that focus on software development versus operations. However, these solutions are not focused on cybersecurity and compliance, and provide limited help to SMBs and enterprises working in highly regulated industries. For example, an SMB or enterprise working with a government entity frequently has to comply with periodic cybersecurity and compliance requests. SMBs and enterprises may have to change configuration parameters in their systems, such as firewall rules, or replace end of life (EOL) software by upgrading to a new version of their operating system. Since most SMBs and enterprises do not have a separate testing environment or another way to predict how such changes will affect their system's performance, this leads to unintended consequences such as applications no longer working.

The traditional way to avoid unintended consequences is to deploy the changes to a small subset of systems in the production environment for a short period of time, e.g. one or two weeks, and have the select end users report if anything "unusual" happens. If nothing "unusual" is reported, then it is assumed that the security changes will have no adverse impact on system functionality or business operations. This approach however does not provide a strong assurance that no unintended consequences will occur because it could be that the users just did not perform a function they normally do so the consequence was not encountered during the "test period." Further, if an issue is encountered, the time it takes to troubleshoot the issue and come to resolution further delays when the security update is deployed throughout the production environment. Another way to avoid unintended consequences is to utilize a parallel test environment where system and security administrators can make the changes and observe the consequences. However, this solution is not feasible for many SMBs and enterprises because it requires an expanded technology budget for equipment, licenses, and cybersecurity and other technical personnel who are in high demand and short supply, to support such testing.

A preferred embodiment of the present invention is now described with reference to the figures. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

DETAILED DESCRIPTION

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

An embodiment of the invention comprises a security compatibility testing platform that can be used to assess functionality of a device after implementing security configurations or patches. An embodiment of the invention utilizes a virtual emulation process to assess the compatibility and configurations.

Figure 1:
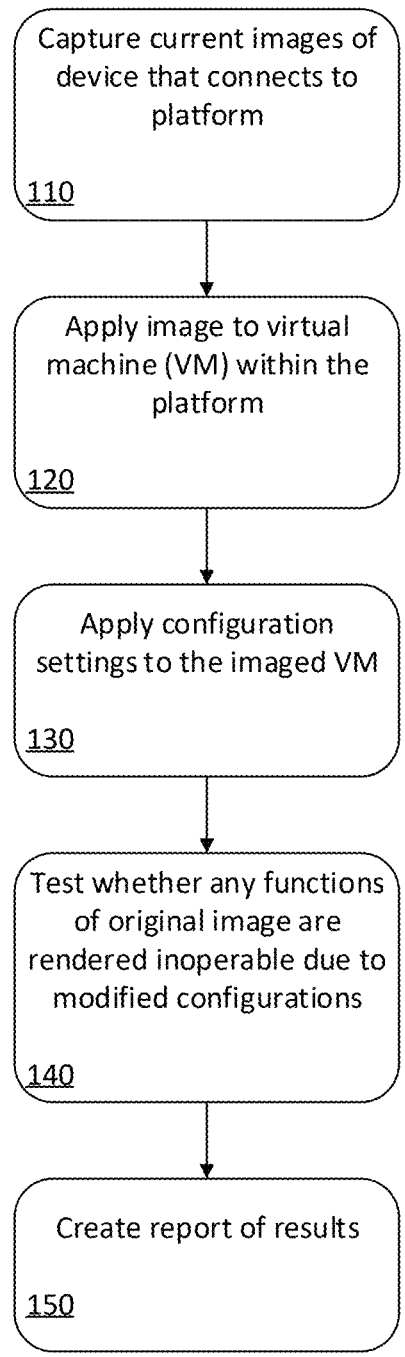
FIG. 1 shows a process that an embodiment of the disclosed platform seeks to automate.

FIG. 1 is a flow diagram of an exemplary method that may be performed using the disclosed platform. An embodiment of the security testing platform comprises a cloud-based platform that automates the following steps: At 110, an image of the connected device being tested is captured. The device may be any computing device, such as a personal computer or a portable computing device. The capture may be performed locally or remotely. If done remotely, the capture may be performed over a network, such as the Internet. In an embodiment, more than one image may be captured. At 120, the captured image may be applied to create a VM within the platform. At 130, a pre-processing module may be utilized to apply secure configurations to the VM. These secure configurations may be implemented by a pre-processing module that sanitizes the VM making it safe to run on the cloud. At 140, functions and commands may be executed on the VM to determine if any functions of the imaged device were rendered inoperable or at reduced capacity due to the modified secure configurations. At 150, a report may be created and if appropriate, the secure configurations may be applied to the connected device. In an embodiment, artificial intelligence may be incorporated into 130 and 140.

Figure 2:
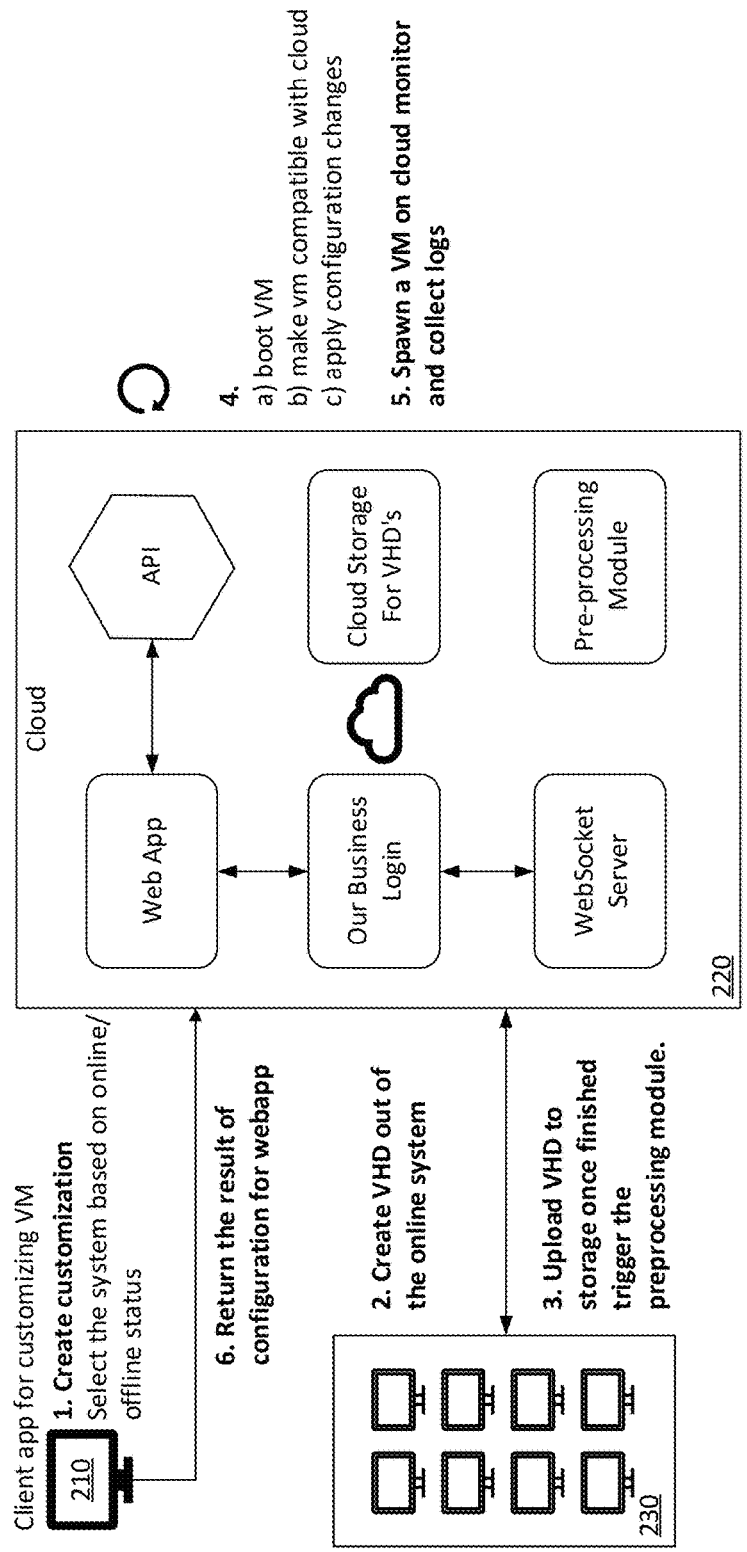
FIG. 2 shows the overall architecture of an embodiment of the disclosed platform.

FIG. 2 depicts an architecture of an embodiment of the disclosed platform. The disclosed platform may be accessed by an end-user 210 and implemented on a cloud platform 220 such as Microsoft® Azure, Amazon Web Services (AWS)® or Google® Compute Engine, for each connected device. Alternative embodiments may use a different cloud platform as would be understood by a person of ordinary skill in the art. Particular features and functionality of cloud 220 are discussed below with respect to FIG. 3. A background service 230 exports a specified drive of the connected device's operating system to a Virtual Hard Disk (VHD) image format for upload to the cloud 220. An embodiment may utilize tools like Disk2VHD or VMware VCenter stand-alone converter to export the image. A VM is built based on the VHD and configuration changes are run by the platform on the VMs in the cloud 220. Logs of results are generated and returned to an end-user 210 based on customized specifications.

Figure 3:
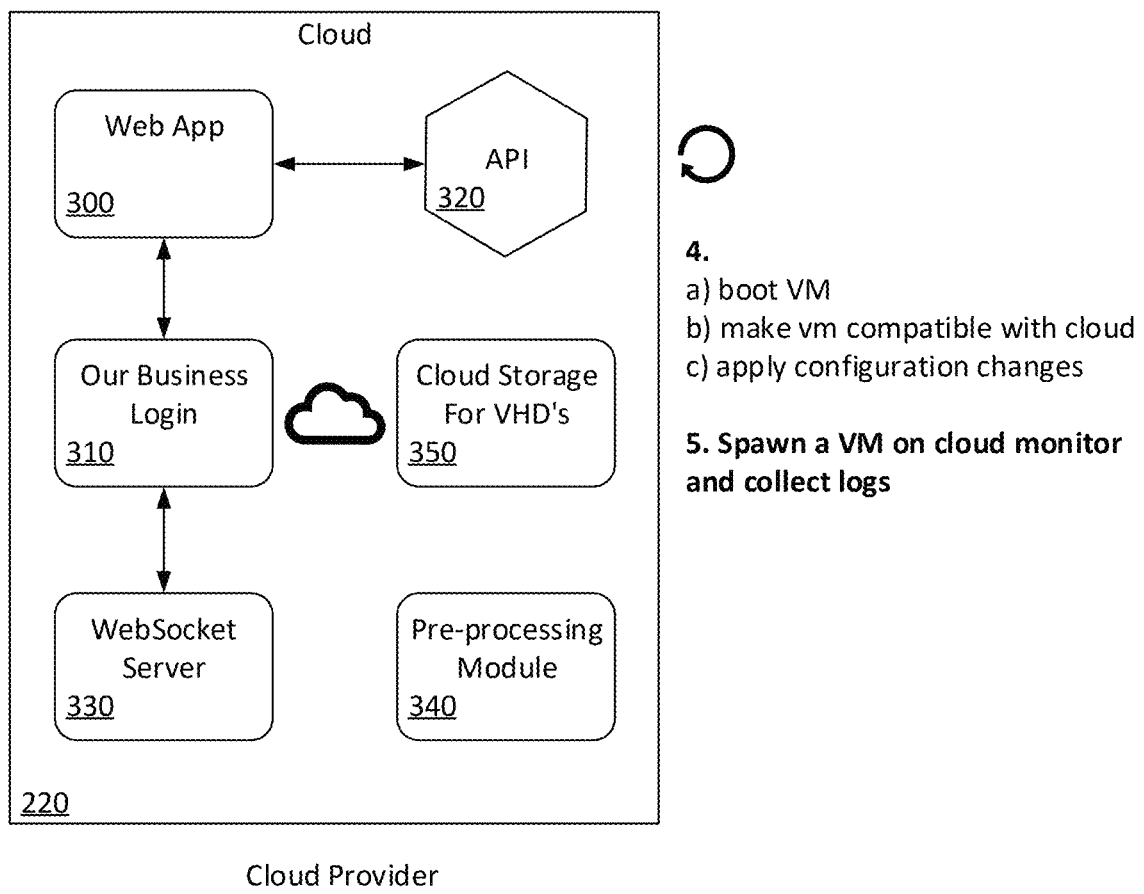
FIG. 3 shows an implementation of the platform on a cloud service.

FIG. 3 depicts an embodiment of a cloud platform 220. Cloud 220 comprises a web-application (web-app) 300 that an end-user can access using a browser and a business login 310. An embodiment of the web-app 300 may utilize Javascript or other options. The web-app 300 displays a status for a connected device (e.g. online/offline) and displays database operations. The web-app 300 lists the available device, security configuration options, current metadata, and the system information of the connected device. Once a user selects the configurations and target drive (e.g. C://drive) on the web-app, the user can initiate the imaging process.

An API server 320 provides dynamic content for the web-app 300. The API Server 320 may use standard MongoDB/Express/Angular/Node.js (MEAN) stack for example. A WebSocket Server 330 and Heartbeats may be used to keep connections live as needed, allowing for identification of devices that are online or offline in the web-app 300. A Command and Control (C&C) Server tracks the status of various component systems and updates the database accordingly, and communicates commands to these component systems. The C&C Server may send commands to the background service 230 and to the VMs. The C&C Server may build on the public domain Ansible system to orchestrate actions of various components and may use Yet Another Markup Language (YAML) to describe the orchestration "playbooks." This build will permit the platform to run on a variety of operating systems.

A Pre-Processing Module 340, comprising a sanitization method for VHDs, may prepare the images to run safely in a virtual environment by applying configurations to create secured versions of the captured images which are stored on the cloud 350. In such an embodiment, the cloud service is notified once the upload of a captured image is complete and initiates a process of sanitizing the captured image and applying configuration changes. In an embodiment of this step, the captured VM is changed in a variety of ways to make it safe to run in the cloud. This process, known as sanitization, prepares the captured image to be safely run in a virtual environment. To apply configuration changes, the platform runs the captured image as a headless VM (a VM without a standard graphical user interface (GUI)) and applies the new configurations. Additionally, to apply these changes, the disclosed system remotely connects to the virtual machine. An embodiment may utilize secure shell (SSH) or Remote Desktop (RDP) to access the VM. Once the security configurations are applied, this creates a secured version of the captured image. In other embodiments, the sequence of operations may be different than as described above.

Using the secured VHD file in the cloud storage 350, in an embodiment, the platform can create a new VM for the user to perform functional tests, monitor impacts, and create a report of events. In other embodiments, testing may be performed on the existing VM. This function may leverage tools of the cloud provider. For example, Azure supports VM monitoring, AWS has a system called CloudWatch, and Google's system is the Cloud-monitoring agent. The API-Server 320 returns the results to the client web-App 300. The web-app 300 may analyze the result and display the impact of the changes to the user.

In an embodiment, artificial intelligence (AI) may automate testing secure configurations and patches in the cloud image. The use of AI positions the disclosed system to achieve full configuration and testing automation, reducing the expertise required by end users. The AI-based embodiment may be refined with input from further end-user input and feedback a.

In some embodiments, computing devices that are imaged may need sufficient memory and disk space to support the image creation process. Embodiments may require that computing devices have minimum specifications or utilize Solid State Drives (SSD). To ensure that the image capture process does not influence foreground processes, an embodiment may allocate a fixed amount of CPU resources to this process. In an embodiment, the disclosed platform may capture images of an entire drive or just parts of one. The cost advantages of using the disclosed platform overcomes concerns over network bandwidth and cost of cloud infrastructure itself.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The invention claimed is:

1. A computing system for security testing of a patch or configuration change to a nonvirtual computing device, the computing system comprising:
   at least one processor having memory coupled thereto, storing processor executable instructions, which when executed by the at least one processor, effect:
   a virtual emulation subsystem configured to capture an image of the nonvirtual computing device for upload to one or more cloud services;

a sanitization subsystem configured to create a secured version of the captured image;

a subsystem for building a virtual machine (VM) from the secured captured image; and a server configured with artificial intelligence and a command and control server that uses infrastructure as a service to orchestrate component actions using a configuration serialization language, where the artificial intelligence (AI) controls and implements command functions on the VM, wherein the AI automates testing secure configurations and patches in the VM; and wherein the sanitization subsystem is further configured to apply the patch or configuration change to the VM and to run the VM in a headless state to determine an impact of the patch or configuration change that will occur on the nonvirtual computing device if applied to the nonvirtual computing device, wherein in the headless state the VM is executed without a standard GUI, wherein a pre-processing module sanitizes the VM to make the VM safe to run within the one or more cloud services; and after the pre-processing module is applied, functions and commands are executed on the VM to determine if any functions of the imaged device are rendered inoperable or at reduced capacity due to the modified secure configurations.

2. The computing system of claim 1, wherein the virtual emulation subsystem further comprises:

a web-app accessed via a browser displaying the nonvirtual computing device; and a background service deployed on the nonvirtual computing device configured to capture an image of an operating system of the nonvirtual computing device.

3. The computing system of claim 1, wherein the sanitization subsystem is further configured to:

access the virtual machine via a secure shell or remote desktop.

4. The computing system of claim 1, wherein the server further comprises an API server providing dynamic content for a web-app.

5. The computing system of claim 1, wherein the configuration serialization language is Yet Another Markup Language (YAML).

6. The computing system of claim 1, wherein the nonvirtual computing device utilizes one or more solid state drives.

7. A computer-implemented method for functional and security testing of a patch or configuration change to a nonvirtual computing device, the method comprising:

using a virtual emulation subsystem to capture an image of the nonvirtual computing device;

building a virtual machine based on the image and sanitizing the virtual machine with a pre-processing module in a headless state without a standard GUI to make the virtual machine safe to run in a cloud environment;

using a configuration serialization language to apply the configuration change or patch to the virtual machine;

executing functions and commands on the virtual machine using artificial intelligence;

determining, using artificial intelligence, a functional or security impact of the patch or configuration change based on said executing step that will occur on the nonvirtual computing device if applied to the nonvirtual computing device, including whether any functions of the nonvirtual computing device will be rendered inoperable or at reduced capacity due to the configuration change or patch; and creating a report of results of said determining step.

8. The method of claim 7, wherein the captured image is exported in a Virtual Hard Disk format.

9. The method of claim 8, wherein the Virtual Hard Disk format is created using a disk capture tool.

10. The method of claim 7, wherein the virtual emulation subsystem captures images of an entire operating system of the nonvirtual computing device.

11. The method of claim 7, wherein the virtual emulation subsystem captures images of portions of an operating system of the nonvirtual computing device, ensuring foreground processes are undisturbed.

12. The computing system of claim 1 wherein the nonvirtual computing device is one of type Internet of Things (IoT), personal computer, or portable computer.

13. The method of claim 7 wherein the nonvirtual computing device is one of type Internet of Things (IoT), personal computer, or portable computer.

14. The method of claim 7, the method further comprising:

applying the patch or configuration change to the nonvirtual computing device.

15. The computing system of claim 1, wherein the virtual emulation subsystem captures images of portions of an operating system of the nonvirtual computing device, ensuring foreground processes are undisturbed.

16. The computer-implemented method of claim 7 wherein the configuration serialization language is Yet Another Markup Language (YAML).

\* \* \* \* \*